United States Patent
Perry

[11] Patent Number: 5,111,710
[45] Date of Patent: May 12, 1992

[54] TOROIDAL RACE ROLLING TRACTION TRANSMISSION UNITS

[76] Inventor: Forbes G. Perry, Long Meadow, Church St., Charlbury, Oxford OX73PP, England

[21] Appl. No.: 668,504
[22] PCT Filed: Sep. 26, 1989
[86] PCT No.: PCT/GB89/01134
  § 371 Date: Mar. 28, 1991
  § 102(e) Date: Mar. 28, 1991
[87] PCT Pub. No.: WO90/04729
  PCT Pub. Date: May 3, 1990

[30] Foreign Application Priority Data
Oct. 27, 1988 [GB] United Kingdom ............ 8825198

[51] Int. Cl.⁵ ............................................ F16H 15/08
[52] U.S. Cl. .................................... 74/200; 74/190.5
[58] Field of Search ............................ 74/200, 190.5

[56] References Cited
U.S. PATENT DOCUMENTS

| | | | |
|---|---|---|---|
| 3,371,546 | 3/1968 | Spangler et al. | 74/200 |
| 3,410,146 | 11/1968 | Nordeen | 74/200 |
| 3,430,504 | 3/1969 | Dickenbrock | 74/200 |
| 3,455,177 | 7/1969 | Schofield | 74/200 |
| 3,653,272 | 4/1972 | Scheiter | 74/200 X |
| 3,802,284 | 4/1974 | Sharpe | 74/200 |
| 3,823,613 | 7/1974 | Abbott | 74/200 |
| 4,499,782 | 2/1985 | Perry | 74/200 |

FOREIGN PATENT DOCUMENTS

| | | | |
|---|---|---|---|
| 1450783 | 12/1964 | Fed. Rep. of Germany | 74/200 |
| 1531007 | 6/1968 | France . | |
| 9005860 | 5/1990 | PCT Int'l Appl. | 74/200 |
| 979062 | 1/1965 | United Kingdom . | |
| 1069874 | 5/1967 | United Kingdom . | |
| 2107009 | 4/1983 | United Kingdom . | |

*Primary Examiner*—Allan D. Herrmann
*Assistant Examiner*—Julie Krolikowski
*Attorney, Agent, or Firm*—Walter C. Farley

[57] ABSTRACT

A toroidal race rolling traction transmission unit has a plurality of rocker arms (10) which are connected by means of a sliding pivot (5) one to each first end of a respective roller carriage (3) and by means of a spherical ball joint (6) including a ball on the rocker and a race at a second end of a respective carriage. The carriage is rotatable about an axis defined by the pivot and the ball joint, whereby movement of the rocker arm causes a change in the transmission ratio.

3 Claims, 2 Drawing Sheets

AXIAL

NORMAL

OBLIQUE 1.0

5.0

1.5

TOROIDAL RACE ROLLING TRACTION TRANSMISSION UNITS

FIELD OF THE INVENTION

This invention relates to toroidal race rolling traction transmission units.

BACKGROUND OF THE INVENTION

Such units, as is well known, typically comprise two coaxial confronting discs defining a toroidal race and a plurality of rollers each engaging the discs to provide a variable transmission ratio between the discs in accordance with the attitude of the rollers with respect to the common axis of the discs. The discs are urged towards each other by a suitable end load in order to provide sufficient traction between the toroidal race of each disc and the rollers. By varying, usually in unison, the common attitude of the rollers with respect to the main, common axis of the input and output discs the transmission ratio may be changed. It is in practice necessary to change the attitude of the rollers by steering them in helical paths with respect to the discs. In a common form of construction, each roller is mounted in a carriage which has a rotary axis lying in a plane substantially normal to the main common axis of the discs. Each carriage may have its rotary axis defined by, at one end of the carriage, a sliding pivot such as a ball guide, and at the other end a spherical ball joint comprising a race and a ball which may be connected to a rocker arm which is or can be pivoted in unison with corresponding rocker arms for the other carriages in order to achieve a change in the attitude of the rollers and accordingly a change in the transmission ratio between the input and output discs.

Toroidal race rolling traction units of the general type are described in GB 979062 and GB 1069874; an arrangement including rocker arms is described in GB 2107009.

In many designs of this general kind there is difficulty in providing sufficient working clearances around the ball socket of the carriage for the roller in order to provide full angular travel of the carriage during a ratio change and yet to keep sufficient material to support the ball on the rocker against severe impulse loading. It is also necessary though difficult to maintain proper clearances between the carriage and the rocker at extreme limits of the range of variation of the attitude of the rollers and accordingly the transmission ratios that they provide.

SUMMARY OF THE INVENTION

One aspect of the present invention is to provide an improved transmission unit including an improved ratio changing mechanism including rocker arms.

The present invention is based on the provision of a ball race which is disposed at an angle which is substantially less than ninety degrees though substantially more than zero degrees with respect to the rotary axis of the carriage. Another aspect of the invention is the provision of a ratio changing mechanism in which each carriage has a sliding pivot connection with one rocker arm and a spherical ball joint connection with another rocker arm, each rocker arm thereby supporting the opposite ends of two carriages, and the rocker arms being movable in unison to cause a change in the attitude of the rollers.

DESCRIPTION OF THE PREFERRED EMBODIMENT

Figure 1:
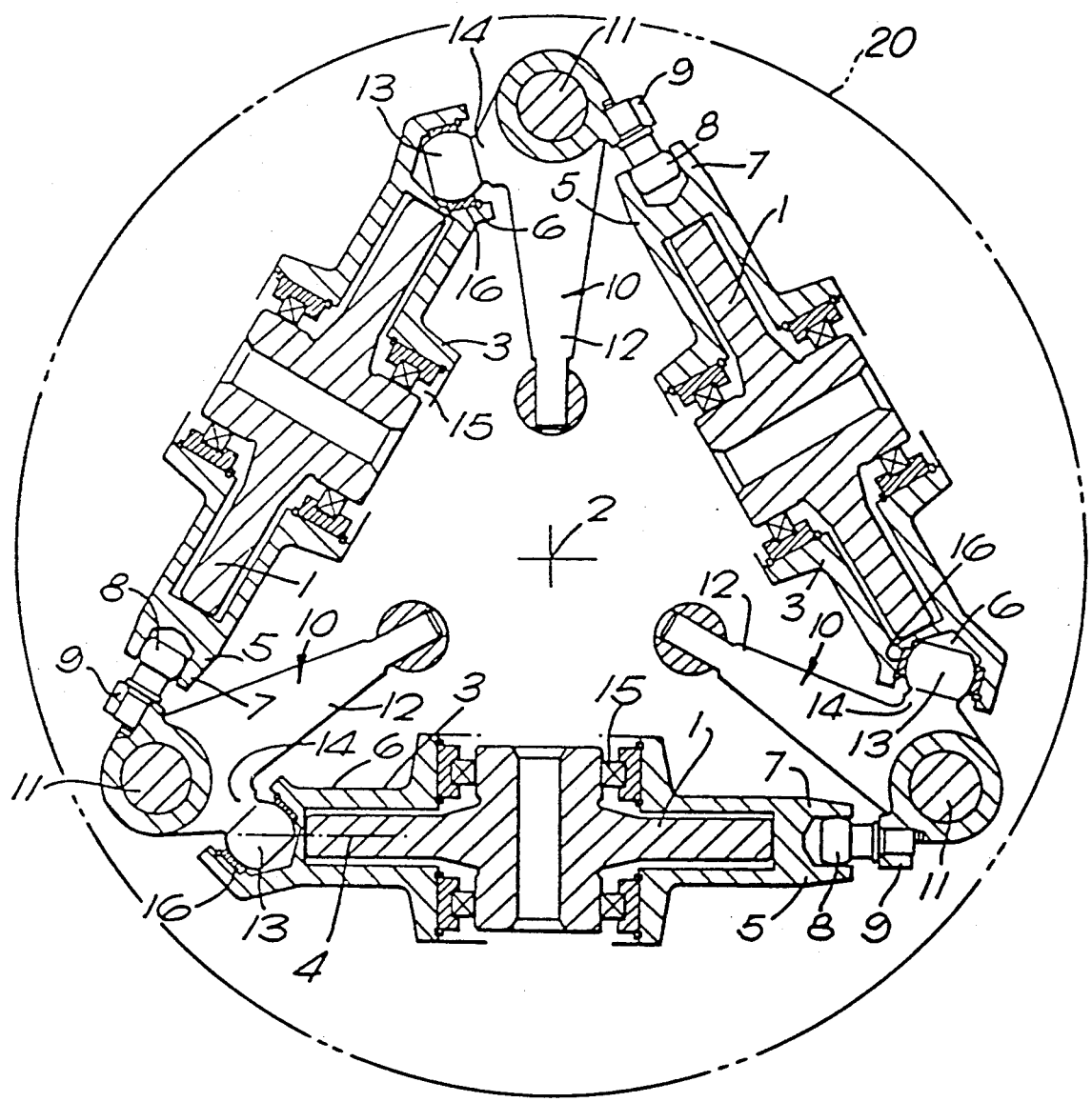
FIG. 1 is a view of part of a toroidal race rolling traction transmission unit showing the characteristic features of the present invention.

FIG. 1 illustrates rollers 1 which are disposed between two confronting coaxial discs 20 in a toroidal race rolling traction unit of the kind described in GB 2107009. The rollers 1 of the present embodiment correspond to the rollers 4 of the aforementioned GB 2107009. The main axis of the discs is identified at 2 in FIG. 1. Each roller is mounted in a carriage 3 corresponding to the carriage 9 in the aforementioned specification.

Each carriage is disposed for bodily movement in a plane which is normal to the main axis 2 and is also capable of movement about an axis 4 defined between a sliding pivot 5 and a ball joint 6. The sliding pivot 5 comprises a cylindrical socket 7 in which is slidable a part spherical head 8 carried on an extension 9 of a rocker arm 10 which is pivoted at 11 and has a main stem 12 extending towards the center of the assembly, generally towards the axis 2. In the present embodiment there are three rollers and associated carriages and three rocker arms. Each rocker arm carries a part spherical ball head 13 on the opposite side of the main stem to the first ball head 8. The line between the centers of the two ball heads for any particular carriage defines the rotary axis of the carriage. The second ball head 13 is separated from the main stem 12 by a neck 14.

In this embodiment of the invention each roller 1 is mounted by means of bearings 15 in its carriage 3 so that it can rotate about an axis generally directed towards the central axis of the assembly.

In earlier practice, as shown in GB-2107009, the ball race 16 for the ball joint 6 is disposed at an angle such that the axis of the ball race is at approximately ninety degrees to the rotary axis 4 of the respective carrier.

In the present embodiment however, the race is disposed obliquely, at an angle substantially more than zero degrees but substantially less than ninety degrees to the rotary axis of the carriage. Preferably the angle is between thirty degrees and sixty degrees from the angle shown in the aforementioned specification.

The fundamental purpose of the joints at each end of the carriage are to take the torque reaction forces of the roller and to define the rotational axis of the carriage. The configuration now adopted allows a reduced rotation component of the carrier on the ball end and thus the facility of providing greater clearance between the carrier and the ball neck and between the carrier socket and the rocker arm. Furthermore, the line of action of the reaction forces of the roller on the ball 13 is resisted mainly by compression of metal in the rocker neck instead of shear at the weakest point under the ball. Moreover, full bearing contact may be provided between the ball and its race to keep the stresses on the ball quite low and reduce wear and play to negligible amounts.

Figure 2:
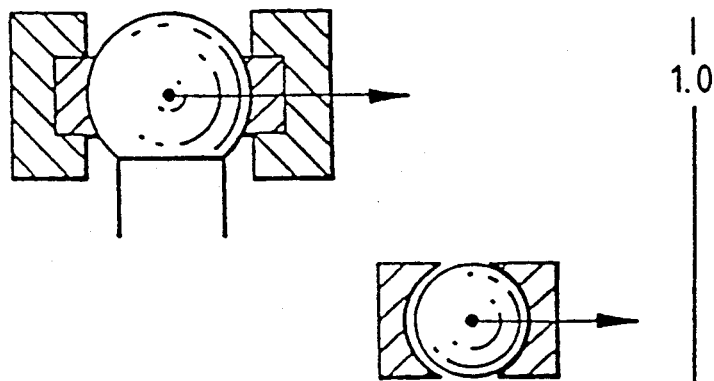
FIG. 2 is an explanatory diagram.
Figure 2:
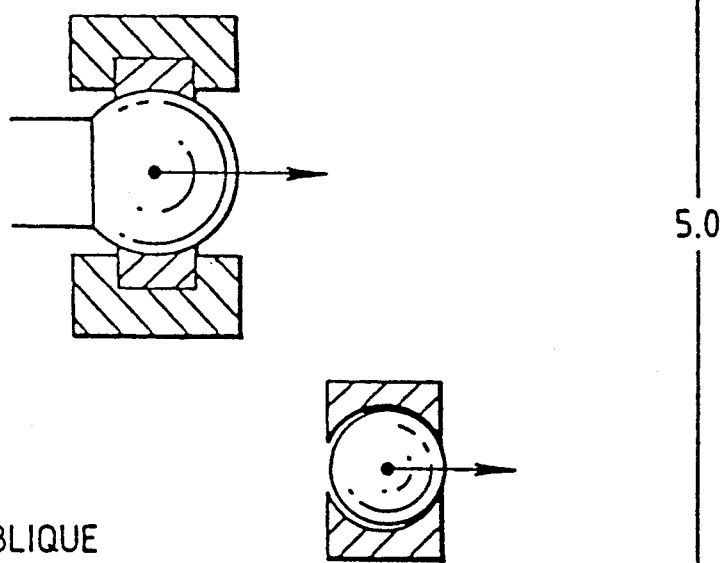
Figure 2:
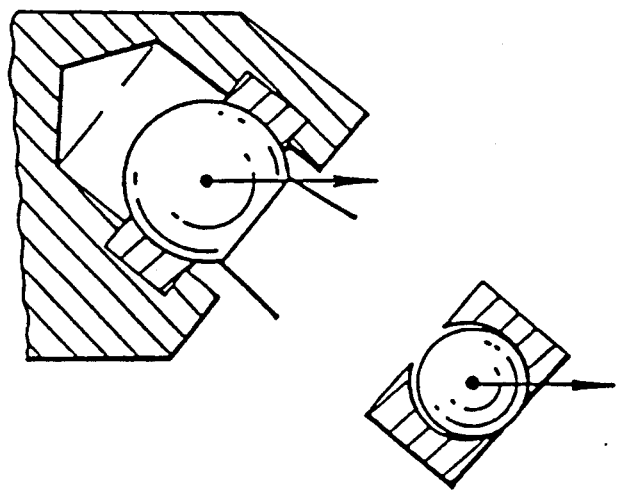

Whatever radial play is present between the ball 13 and its race, the consequent movement of the carriage, which constitutes a ratio change signal, is not multiplied by much because of an oblique angle of operation. In FIG. 2 the relative axial play, bearing surface load and rotary friction are indicated for axial, normal and oblique configurations of ball and race. If, for instance, the ball cage were at ninety degrees to the roller axial center line the effect of such an angle would be to increase the axial carriage play for a given amount of radial ball race clearance by about five times, to increase the contact stress on the ball for a given carriage reaction load and thereby increase wear and to increase frictional resistance to the rotational movements of the carrier during ratio change. Keeping axial play small in torque reversals minimises the amount of ratio change between drive and overrun.

I claim:

1. A toroidal race rolling traction transmission unit comprising
    a pair of confronting coaxial discs;
    a plurality of rollers engaging said discs, said rollers being movable to provide a variable transmission ratio between said discs;
    a plurality of carriages, each carriage supporting a roller;
    a plurality of rocker arms, each said rocker arm including a sliding pivot connecting one side of said rocker arm to a carriage, and
    a spherical ball joint connecting the other side of said rocker arm to a different carriage, said spherical ball joint including a ball on said rocker arm and a ball race carried by said carriage;
pairs of said sliding pivots and said ball joints defining a plurality of axes about each of which a carriage is rotatable whereby movement of said rocker arms causes a change in said transmission ratio, said ball race on each said carriage being set at an angle of substantially more that 0° and substantially less than 90° to the axis of rotation of said carriage.

2. A unit according to claim 1 wherein the angle at which the ball race is disposed is between thirty and sixty degrees with respect to the rotary axis of the respective carriage.

3. A toroidal race rolling traction transmission unit comprising
    a pair of confronting coaxial discs;
    a plurality of carriages, each carriage having two ends;
    a plurality of rollers engaging said discs, each said roller being rotatably carried by a carriage, said rollers being movable to provide a variable transmission ratio between said discs;
    a plurality of rocker arms, each said rocker arm including a sliding pivot connecting one side of said rocker arm to one end of a carriage, and a spherical ball joint connecting the other side of said rocker arm to the other end of a different carriage, said spherical ball joint including a ball on said rocker arm and a ball race carried by said carriage;
    a sliding pivot and a ball joint at opposite ends of each carriage defining an axis about which said carriage is rotatable whereby movement of said rocker arms causes a change in said transmission ratio, said ball race on each said carriage being set at an angle of substantially more than 0° and substantially less than 90° to the axis of rotation of said carriage.

* * * * *